United States Patent
Morette

(10) Patent No.: US 11,318,547 B1
(45) Date of Patent: May 3, 2022

(54) APPARATUSES, SYSTEMS, AND METHODS FOR REMOVING AND INSTALLING A SLASHER TOOTH IN A SAW BLADE

(71) Applicant: Joseph Morette, Henniker, NH (US)

(72) Inventor: Joseph Morette, Henniker, NH (US)

( * ) Notice: Subject to any disclaimer, the term of this patent is extended or adjusted under 35 U.S.C. 154(b) by 0 days.

(21) Appl. No.: 17/562,337

(22) Filed: Dec. 27, 2021

Related U.S. Application Data

(63) Continuation of application No. 17/347,140, filed on Jun. 14, 2021, now Pat. No. 11,213,904.

(60) Provisional application No. 63/050,966, filed on Jul. 13, 2020, provisional application No. 63/039,687, filed on Jun. 16, 2020.

(51) Int. Cl.
| | |
|---|---|
| *B23D 61/06* | (2006.01) |
| *B23D 61/02* | (2006.01) |
| *B21J 15/02* | (2006.01) |
| *B21J 15/50* | (2006.01) |
| *B21J 15/38* | (2006.01) |

(52) U.S. Cl.
CPC ............. *B23D 61/06* (2013.01); *B21J 15/02* (2013.01); *B21J 15/38* (2013.01); *B21J 15/50* (2013.01); *B23D 61/021* (2013.01)

(58) Field of Classification Search
CPC ........ B23D 61/06; B23D 61/021; B21J 15/50; B21J 15/041
See application file for complete search history.

(56) References Cited

U.S. PATENT DOCUMENTS

| | | | |
|---|---|---|---|
| 380,703 A | 4/1888 | Snitzel | B21J 15/50 |
| 848,252 A | 3/1907 | Kitterman | B25B 27/023 |
| 1,687,326 A | 10/1928 | Crowe | B21J 15/50 |
| 2,594,802 A | 4/1952 | Rein | 78/46 |
| 3,063,236 A | 11/1962 | Cannon | 59/7 |
| 3,176,399 A | 4/1965 | Marino et al. | 30/367 |
| 3,234,634 A | 2/1966 | Johnson et al. | 29/200 |
| 3,412,597 A | 11/1968 | Rains | 72/454 |
| 3,633,637 A | 1/1972 | Kolesh et al. | B23D 65/00 |
| 3,827,125 A | 8/1974 | Matthews | B23P 19/00 |
| 4,404,871 A | 9/1983 | Fritz et al. | B23D 63/16 |
| 4,524,664 A * | 6/1985 | Tuomaala | B23D 61/06 83/840 |
| 4,602,414 A | 7/1986 | Bartholomew et al. | B23P 11/00 |
| 4,637,113 A | 1/1987 | Cook | B23P 11/00 |
| 4,949,446 A | 8/1990 | Kuwica | B25B 1/24 |
| 4,955,273 A | 9/1990 | Pawlosky | B23D 61/06 |
| 4,988,031 A | 1/1991 | Jordan | B25C 11/00 |

(Continued)

OTHER PUBLICATIONS https://www.youtube.com/watch?v=_flqvTdW-JE "Bells 4000 Gets New Set of Slasher Teeth!" (Year: 2021).*

(Continued)

*Primary Examiner* — Sean M Michalski

(74) *Attorney, Agent, or Firm* — Hayes Soloway P.C.

(57) ABSTRACT

An apparatus, system, and method for withdrawing slasher teeth from a slasher saw are provided. The apparatus has a handle, and a forked portion is connected to one end of the handle. A gap is formed between two prongs of the forked portion. A floating shank positioner is positioned at least partially within the gap. At least one common hole is formed through the two prongs of the forked portion. When the slasher tooth is connected to the at least one common hole, pivoting of the handle removes the slasher tooth from the pocket of the saw.

20 Claims, 16 Drawing Sheets

(56) References Cited

U.S. PATENT DOCUMENTS

| | | | | |
|---|---|---|---|---|
| 5,119,545 | A | 6/1992 | Anderson et al. | B23P 11/00 |
| 5,140,736 | A | 8/1992 | Hsiao | B25B 1/24 |
| 5,168,616 | A | 12/1992 | Klein | B23P 19/04 |
| 5,713,117 | A | 2/1998 | Bliss | B23P 19/04 |
| 6,006,410 | A | 12/1999 | Hudspeth et al. | B23P 19/02 |
| 6,196,106 | B1 | 3/2001 | Kurelek et al. | |
| 6,546,610 | B2 | 4/2003 | Klann | B23P 19/04 |
| 9,174,269 | B2 | 11/2015 | Hall et al. | B25B 27/02 |
| 2002/0073527 | A1* | 6/2002 | Satran | B25B 13/481 |
| | | | | 29/428 |
| 2014/0027688 | A1* | 1/2014 | Vesely | B66F 15/00 |
| | | | | 254/131.5 |
| 2015/0056031 | A1* | 2/2015 | Gehlsen | B23B 39/26 |
| | | | | 408/198 |
| 2019/0351478 | A1 | 11/2019 | Amador | B21J 15/50 |
| 2020/0048142 | A1* | 2/2020 | Donovan | C03C 17/002 |
| 2020/0049294 | A1* | 2/2020 | Rezaei | F16K 27/003 |
| 2020/0147674 | A1 | 5/2020 | Brewer et al. | B23D 15/04 |
| 2020/0212493 | A1* | 7/2020 | Busacca | H01M 10/0404 |

OTHER PUBLICATIONS

YouTube video entitled "Changing saw teeth!!!!", uploaded Nov. 29, 2016, found at https://www.youtube.com/watch?v=4dynyR0ie0U, accessed as early as Jul. 22, 2020, 3 pgs.

YouTube video entitled "Changing the Kodiak style teeth on the Simonds saw on the slasher.", uploaded Nov. 28, 2018, found at https://www.youtube.com/watch?v=tRJKu0E9w0c, accessed as early as Jul. 22, 2020, 3 pgs.

U.S. Appl. No. 17/347,140, filed Jun. 14, 2021.

\* cited by examiner

APPARATUSES, SYSTEMS, AND METHODS FOR REMOVING AND INSTALLING A SLASHER TOOTH IN A SAW BLADE

CROSS REFERENCE TO RELATED APPLICATION

This application is a continuation of U.S. application Ser. No. 17/347,140 filed Jun. 14, 2021 entitled "Apparatuses, Systems, and Methods for Removing and Installing a Slasher Tooth in a Saw Blade", which claims benefit of U.S. Provisional Application Ser. No. 63/039,687 filed Jun. 16, 2020, and U.S. Provisional Application Ser. No. 63/050,966 filed Jul. 13, 2020, both of which entitled, "Apparatuses, Systems, and Methods for Removing and Installing a Slasher Tooth in a Saw Blade," the entire disclosures of which are incorporated herein by reference.

FIELD OF THE DISCLOSURE

The present disclosure is generally related to tools and more particularly is related to apparatuses, systems, and methods for removing and installing a slasher tooth in a saw blade.

BACKGROUND OF THE DISCLOSURE

Large, circular saws are often used to transform raw logs into smaller pieces of wood, such that those smaller pieces of wood can be used to make various wood products, such as lumber, posts, or the like. One type of circular saw is referred to as a 'slasher saw' which has a saw body having a plurality of grooved pockets which are sized for the tooth shank positioned around the circumference or center hole of the saw body. A saw body has pockets against the circumference, where the removable slasher tooth is insertable into each of the pockets and held in place with a rivet positioned to engage the shank of the slasher tooth and the saw body. An exterior edge of the slasher tooth has a cutting edge, and as the saw is operated, the cutting edges become dull or broken and are in need of replacing. Replacement involves removing the rivet, then removing the entire slasher tooth, installing a new slasher tooth, and a new rivet.

FIGS. 1A-1C are illustrations of the slasher tooth removal process, in accordance with the prior art. FIG. 1A illustrates the saw body 10 with the slasher tooth 12 positioned within the saw body pocket 14. The slasher tooth 12 has a cutting edge 16 which extends radially beyond the saw body 10. A rivet 18A holds the slasher tooth 12 within the pocket 14. Removal of the slasher tooth 12 can be achieved with a rivet removal tool 20, as shown in FIG. 1B. The tool 20 has a U-shaped design which fits about both sides of the saw body 10, and has a threaded pin 22 which can be rotatably engaged to apply a force against the rivet 18. As the user rotates the pin 22, it moves towards the rivet 18B to push it out of the saw body 10 and slasher tooth 12. Once the rivet 18B is removed, a user can then use a pin and hammer, as shown in FIG. 1C, to remove the slasher tooth 12 from the pocket 14 of the saw body 10. The user would position the pin within the hole evacuated by the removed rivet 18A or 18B and apply blows against the pin in a radial direction along the saw body 10. These repeated blows transfer the force to the slasher tooth 12, which is then removed from the pocket 14 of the saw body 10. The user can then install a new slasher tooth 12 and a new rivet 18A. This process is repeated for all of the needed slasher teeth 12 in the saw.

This process for removing slasher teeth is very time consuming, often taking many hours to replace the teeth on just one blade. The process is also cumbersome and inaccurate. Hammers or similar tools are usually needed to force the materials to the desired position. This can cause damage to other parts of the saw and naturally, cause frustration and injury in the installer. It can also be a fire hazard if a user is required to use a torch or similar implement to aid in removal of the rivet 18A or 18B.

Thus, a heretofore unaddressed need exists in the industry to address the aforementioned deficiencies and inadequacies.

SUMMARY OF THE DISCLOSURE

Embodiments of the present disclosure provide an apparatus, system, and method for withdrawing slasher teeth from a saw. Briefly described, in architecture, one embodiment of the system, among others, can be implemented as follows. The apparatus has a handle, and a forked portion is connected to one end of the handle. A gap is formed between two prongs of the forked portion. A floating shank positioner is positioned at least partially within the gap. At least one common hole is formed through the two prongs of the forked portion. When the slasher tooth is connected to the at least one common hole, pivoting of the handle removes the slasher tooth from the pocket of the saw.

The present disclosure can also be viewed as providing a system for withdrawing slasher teeth from a slasher saw body. Briefly described, in architecture, one embodiment of the system, among others, can be implemented as follows. A system for withdrawing a slasher tooth from a pocket of a slasher saw includes a slasher saw having a saw body with at least one slasher tooth positioned within at least one saw body pocket of the slasher saw. An apparatus for withdrawing the slasher tooth from the saw body pocket of the slasher saw has a handle, and a forked portion connected to one end of the handle. A gap is formed between two prongs of the forked portion. A floating shank positioner is positioned at least partially within the gap. At least one common hole is formed through the two prongs of the forked portion. At least one pin is connectable between the slasher tooth and the prongs of the forked portion. When the slasher tooth is connected to the prongs, pivoting of the handle removes the slasher tooth from the saw body pocket.

The present disclosure can also be viewed as providing methods of withdrawing slasher teeth from a saw. In this regard, one embodiment of such a method, among others, can be broadly summarized by the following steps: providing a slasher saw having a saw body with at least one slasher tooth positioned within at least one saw body pocket of the slasher saw; providing an apparatus for withdrawing the slasher tooth from the saw body pocket of the slasher saw, the apparatus having: a handle, a forked portion connected to one end of the handle, wherein a gap is formed between two prongs of the forked portion, a floating shank positioner positioned at least partially within the gap, and at least one common hole formed through the two prongs of the forked portion; connecting at least one pin between the slasher tooth and the prongs of the forked portion; and pivoting of the handle relative to the slasher saw, thereby removing the slasher tooth from the saw body pocket.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1A:
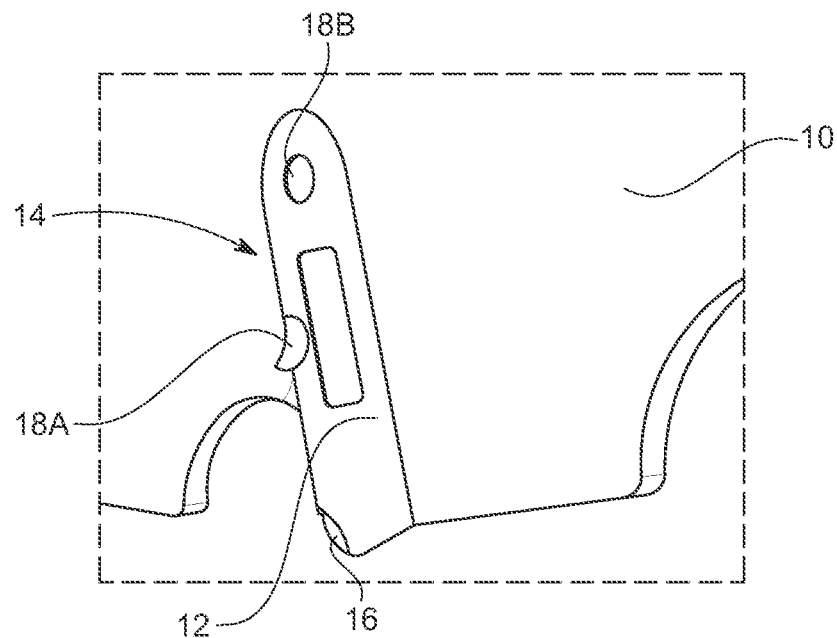
FIGS. 1A-1C are illustrations of the slasher tooth removal process, in accordance with the prior art.
Figure 1B:
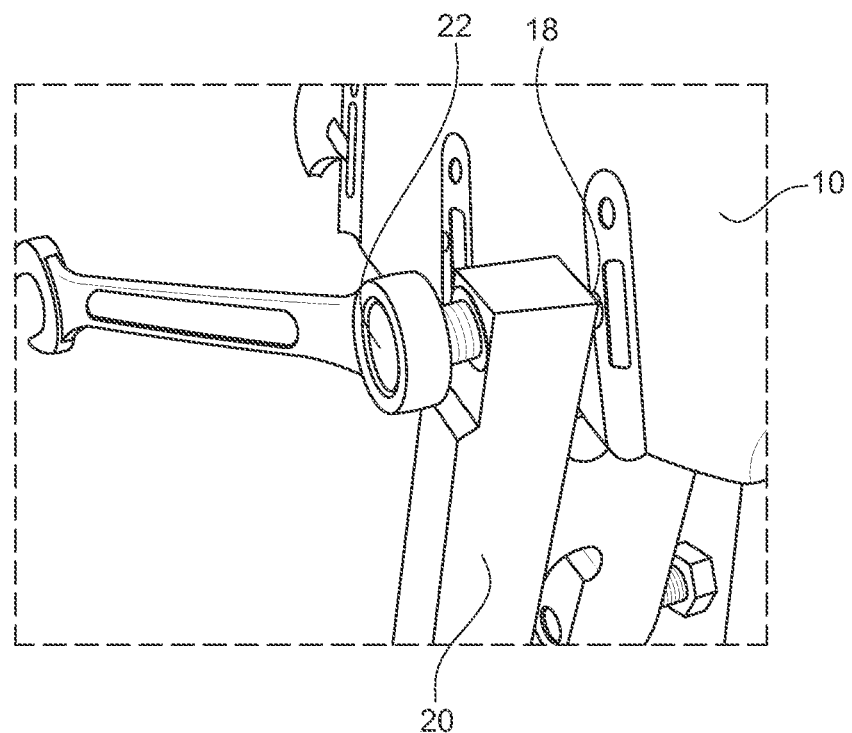
Figure 1C:
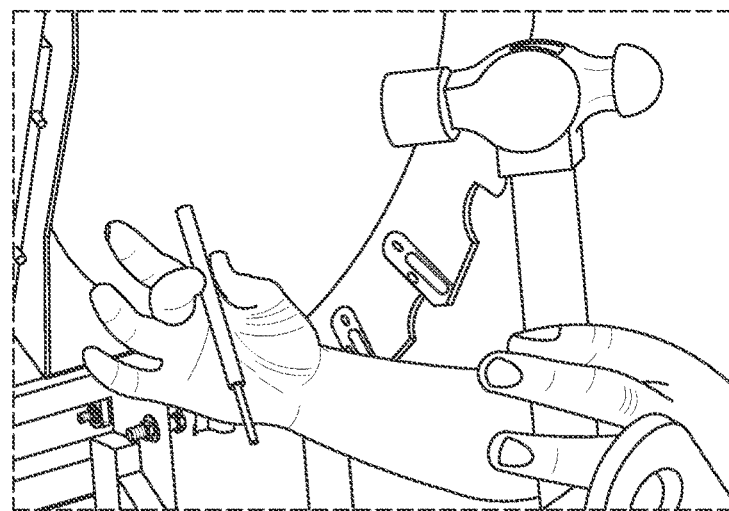
Figure 2:
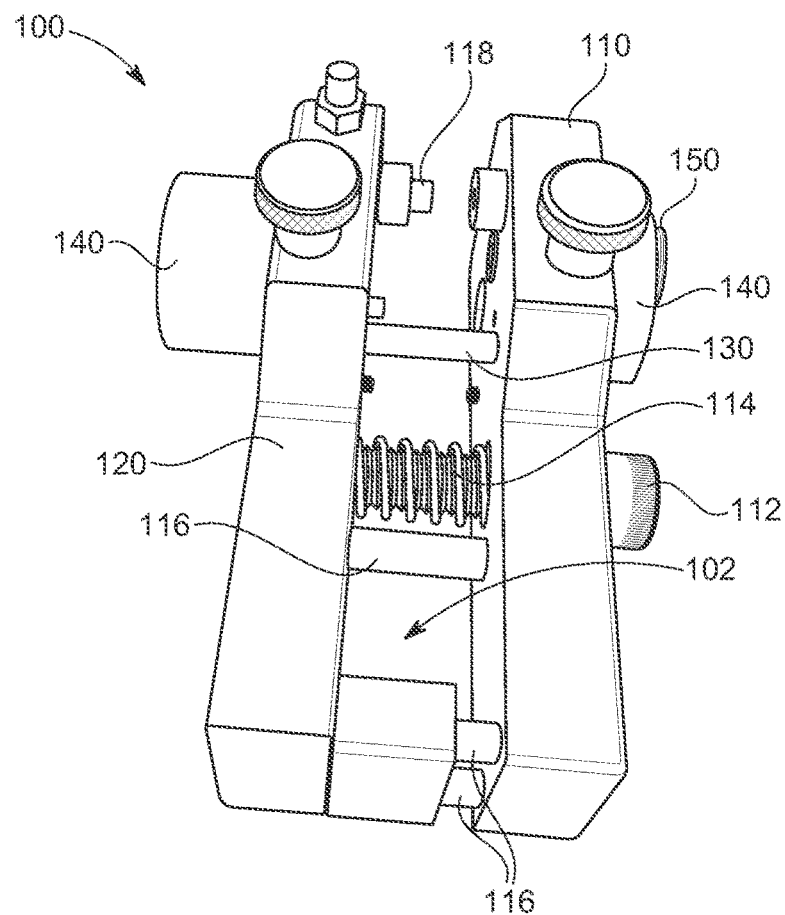
FIGS. 2-6 are illustrations of an apparatus for removing and installing slasher teeth in a saw, in accordance with a first exemplary embodiment of the present disclosure.
Figure 3:
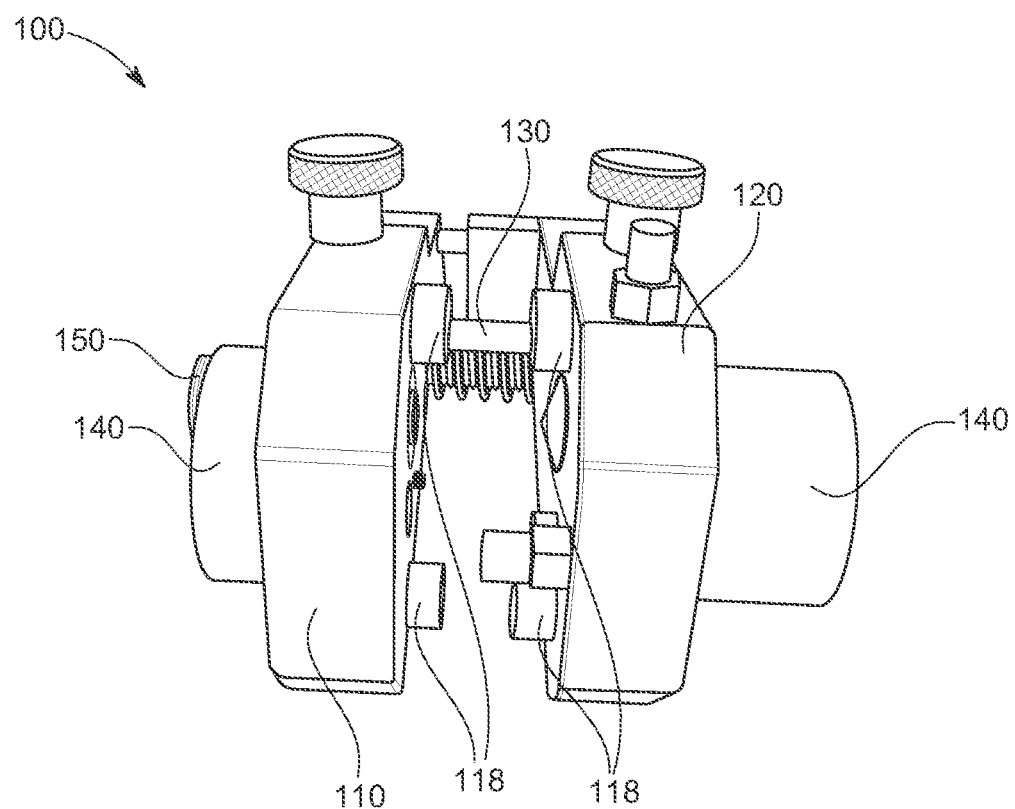

To overcome the deficiencies identified relative to FIGS. 1A-1C, the subject disclosure provides an apparatus for removing and installing slasher teeth in a saw. FIGS. 2-6 are illustrations of an apparatus for removing and installing slasher teeth in a saw 100, in accordance with a first exemplary embodiment of the present disclosure. The apparatus for removing and installing slasher teeth in a saw 100, which may be referred to herein as 'apparatus 100' includes a first body 110 and a second body 120 having a space 102 formed therebetween. A slasher tooth 12 (FIGS. 10-15) is positionable within the space 102. At least one locator pin 130 is connected to at least one of the first and second body 110, 120. The at least one locator pin 130 is for locating the apparatus 100 relative to the slasher tooth 12. A rotatable cylinder 140 is positioned in at least one of the first or second body 110, 120. At least two engagement devices 150 are positioned within the rotatable cylinder 140. Actuation of one of the engagement devices 150 causes removal or insertion of a slasher tooth rivet 18 (FIGS. 10-15).

Figure 6:
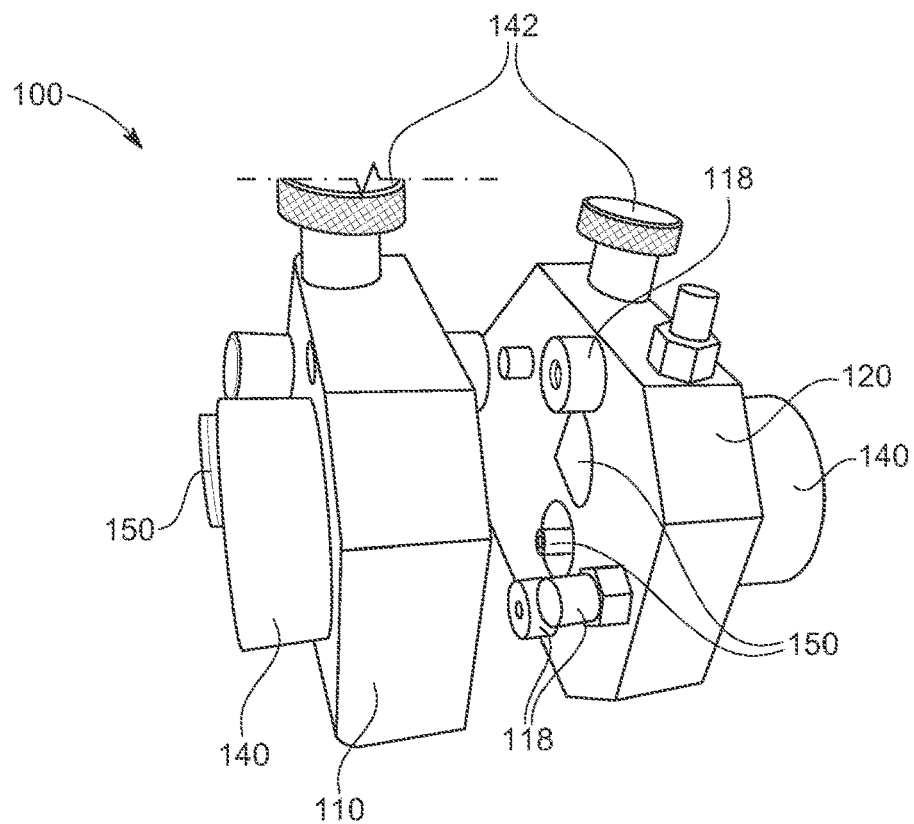
Figure 7:
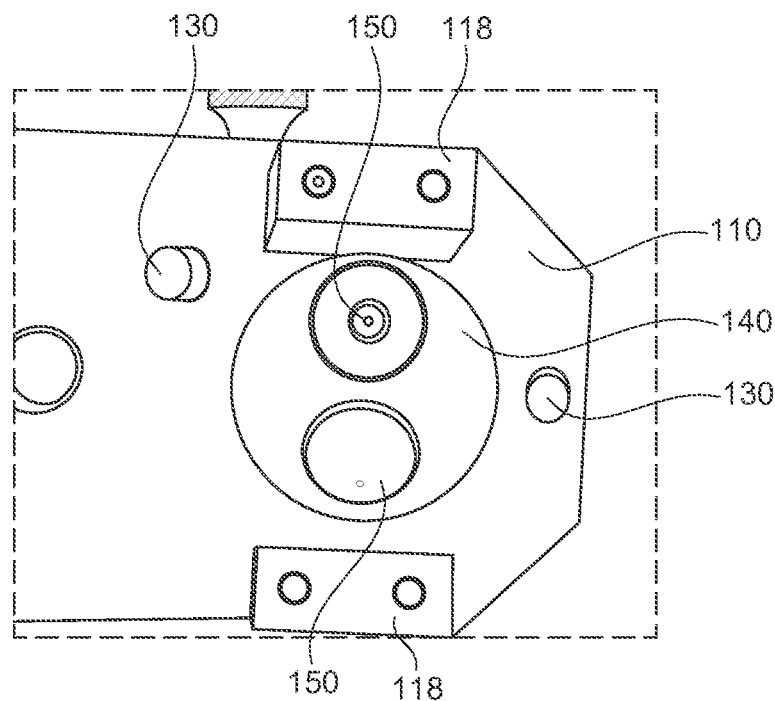
FIGS. 7-9 are illustrations of the rotatable cylinder and engagement devices within the apparatus for removing and installing slasher teeth in a saw of FIGS. 2-6, in accordance with the first exemplary embodiment of the present disclosure.
Figure 8:
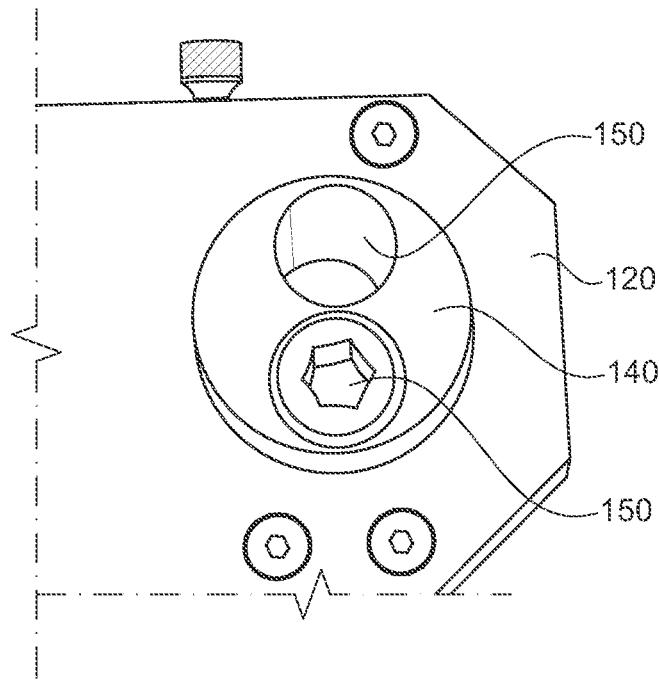
Figure 9:
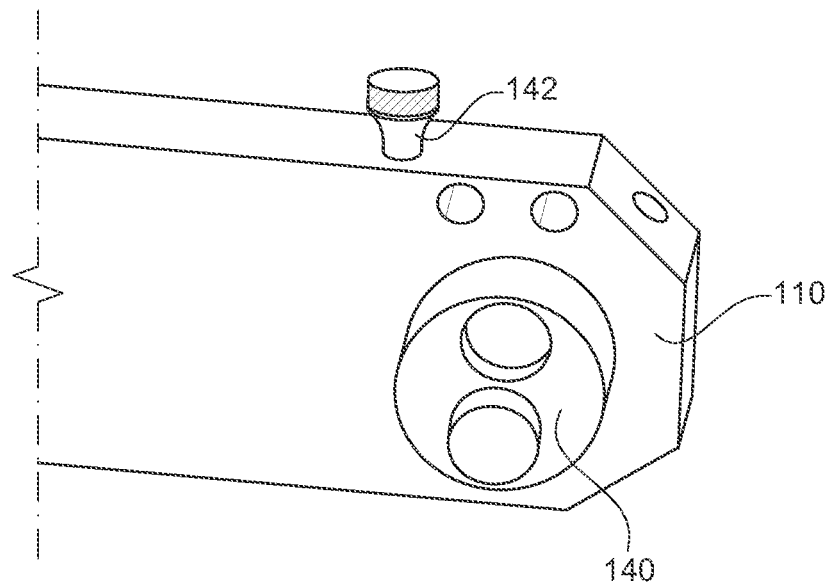
Figure 10:
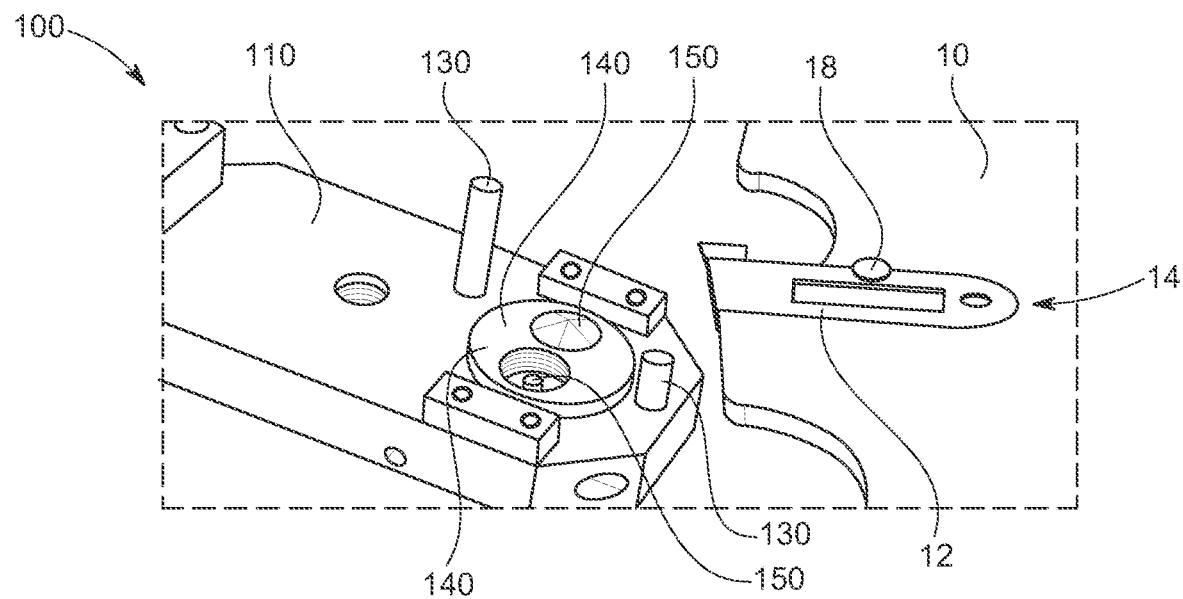
FIGS. 10-11 are illustrations of part of the apparatus for removing and installing slasher teeth in a saw of FIGS. 2-6 in use with a slasher tooth, in accordance with the first exemplary embodiment of the present disclosure.
Figure 11:
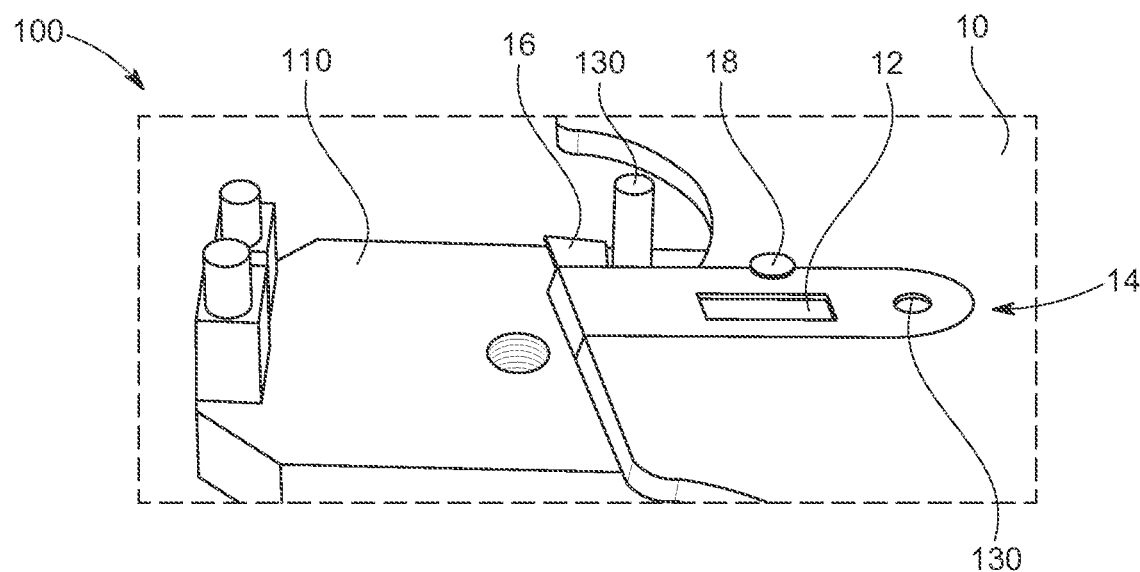
Figure 12:
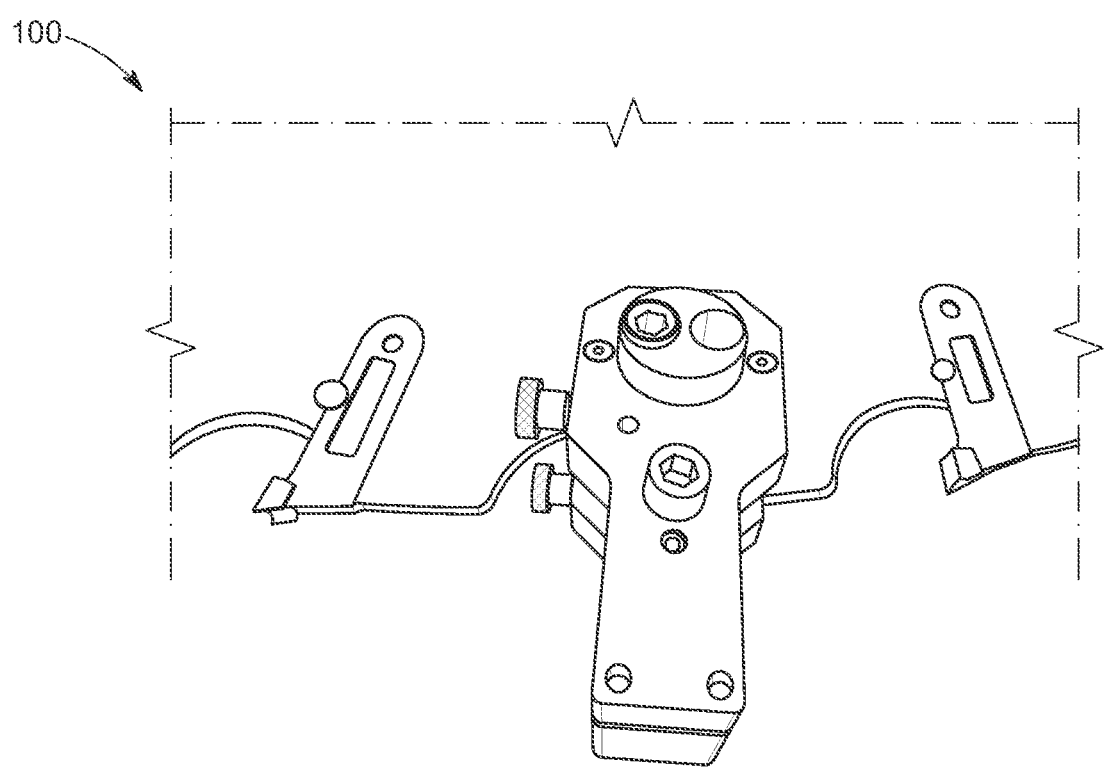
FIGS. 12-15 are illustrations of the apparatus for removing and installing slasher teeth in a saw of FIGS. 2-6 in use with a slasher tooth, in accordance with the first exemplary embodiment of the present disclosure.
Figure 13:
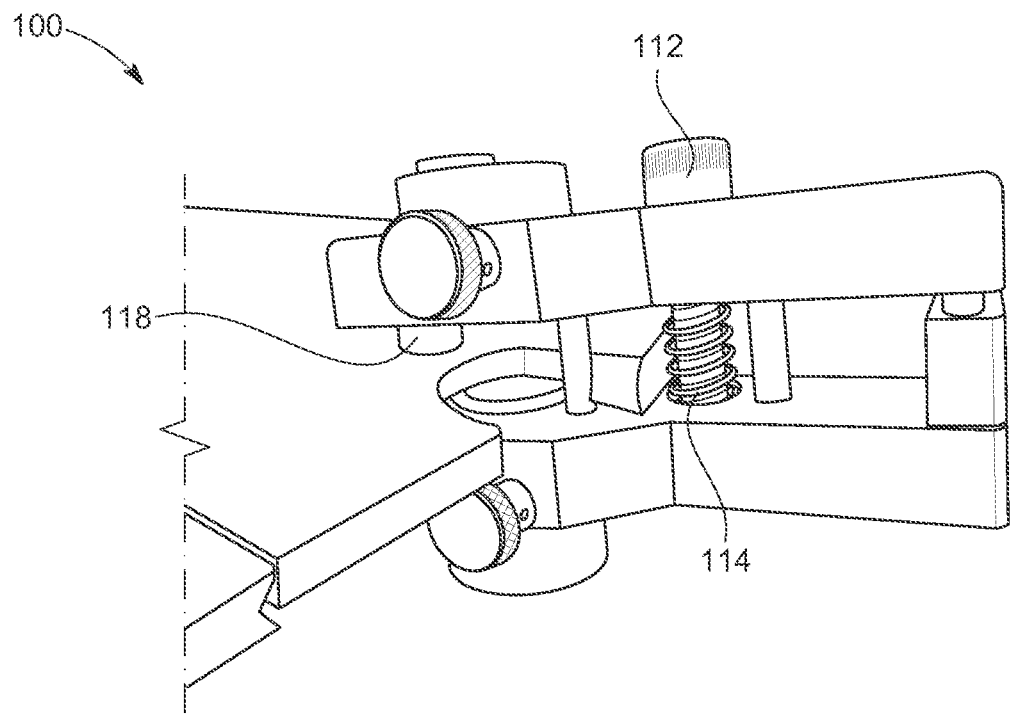
Figure 14:
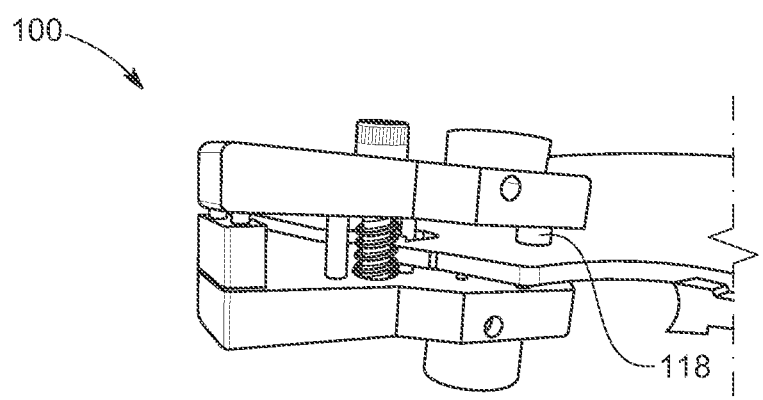
Figure 15:
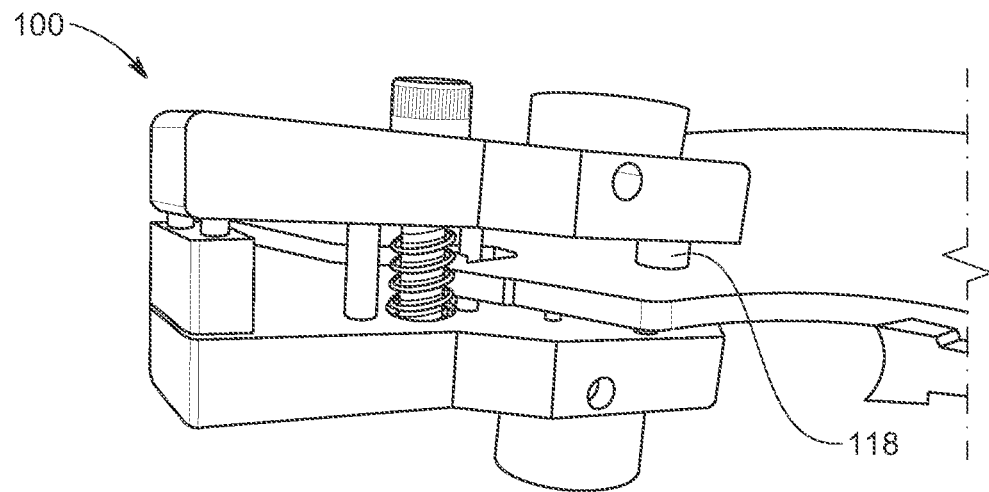

FIGS. 7-9 are illustrations of the rotatable cylinder 140 and engagement devices 150 within the apparatus 100 of FIGS. 2-6, in accordance with the first exemplary embodiment of the present disclosure. FIGS. 10-11 are illustrations of part of the apparatus 100 of FIGS. 2-6 in use with a slasher tooth, in accordance with the first exemplary embodiment of the present disclosure. FIGS. 12-15 are illustrations of the apparatus 100 of FIGS. 2-6 in use with a slasher tooth, in accordance with the first exemplary embodiment of the present disclosure.

With reference to FIGS. 2-15 together, the apparatus 100 may be used to remove and/or install a slasher tooth 12 from a saw body 10. In particular, the apparatus 100 may be used to accurately and efficiently remove the slasher tooth rivet 18 which is holding the slasher tooth 12 within the pocket 14 of the saw body 10. As shown in the figures, the apparatus 100 includes a two-part body design with a first body 110 or first portion which is spaced a distance 102 from a second body 120 or second portion. The first and second bodies 110, 120 may be removably connectable to each other through the use of a threaded fastener 112 and a biasing device, such as a spring 114. The spring 114 biases the first and second body 110, 120 away from one another, thereby creating the space 102, while the threaded fastener 112 (or any other type of fastener) prevents the first and second body 110, 120 from being separated. When the apparatus 100 is positioned around a saw body 10 (FIGS. 12-15), the user may actuate the fastener 112 to clamp the first and second body 110, 120 around the saw body 10. The apparatus 100 also includes one or more alignment devices 116, such as alignment pins (FIG. 2), which ensures that the first body 110 and the second body 120 are in correct alignment with one another.

Additionally, the apparatus 100 also includes one or more contact spacers 118, and preferably at least two contact spacers 118 positioned on each of the first and second body 110, 120 in a position proximate to the saw body 10 when the apparatus 100 is in use. The contact spacers 118 may contact the saw body 10 and eliminate twisting of the apparatus 100 when the compressive force is applied to the rivet. The contact spacers 118 may be positioned substantially opposite one another, such that when the force is applied to the rivet, the contact spacer 118 on the first body 110 substantially matches the location of the contact spacer 118 on the second body 120. Additionally contact spacers 118 may also be used, such as in a location near the fastener 112 or between the fastener 112 and the terminating end of the apparatus 100. The shape of the contact spacer 118 may be substantially cylindrical, as shown in some figures, or cuboid, as shown in other figures. Any number, location, or shape of the contact spacers 118 is considered within the scope of the present disclosure.

As best shown in FIGS. 10-11, the apparatus 100 includes at least one locator pin 130, which may be positioned in a shank tooth locating hole at the end of the tooth 12. There may commonly be at least two locator pins 130, which are used to correctly locate the apparatus 100 to the slasher tooth 12. For example, one locator pin 130 may be positioned to engage with an aperture at the distal end of the shank of the slasher tooth 12 while a second locator pin 130 may be positioned to substantially abut the cutting edge 16 of the tooth 12. The locator pins 130 may engage with the tooth 12 snugly, such that the apparatus 100 can be held in a substantially stationary position relative to the tooth 12. In some situations, the apparatus 100 may be held in a radial position relative to the tooth 12 through the locator pin 130 positioned within the aperture of the slasher tooth 12. The apparatus 100 may be movable in a radial position around this aperture such that the second locator pin 130 can be positioned against the face of the tooth 12, below the cutting edge 16. In this way, the apparatus 100 is still movable, to a degree, relative to the tooth 12, but can be easily moved to the desired position about the tooth 12.

Figure 4:
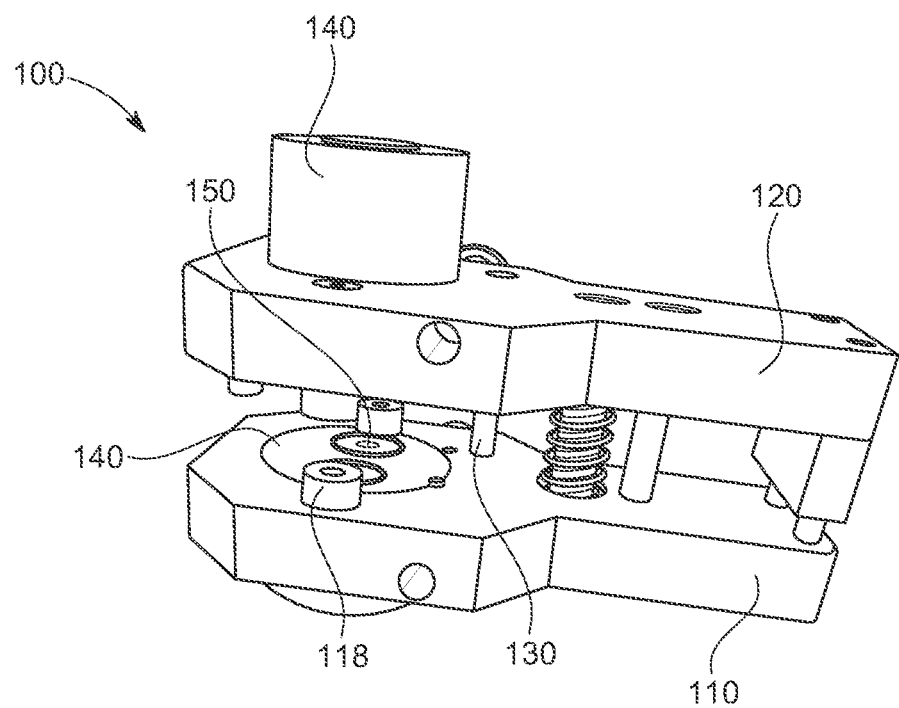
Figure 5:
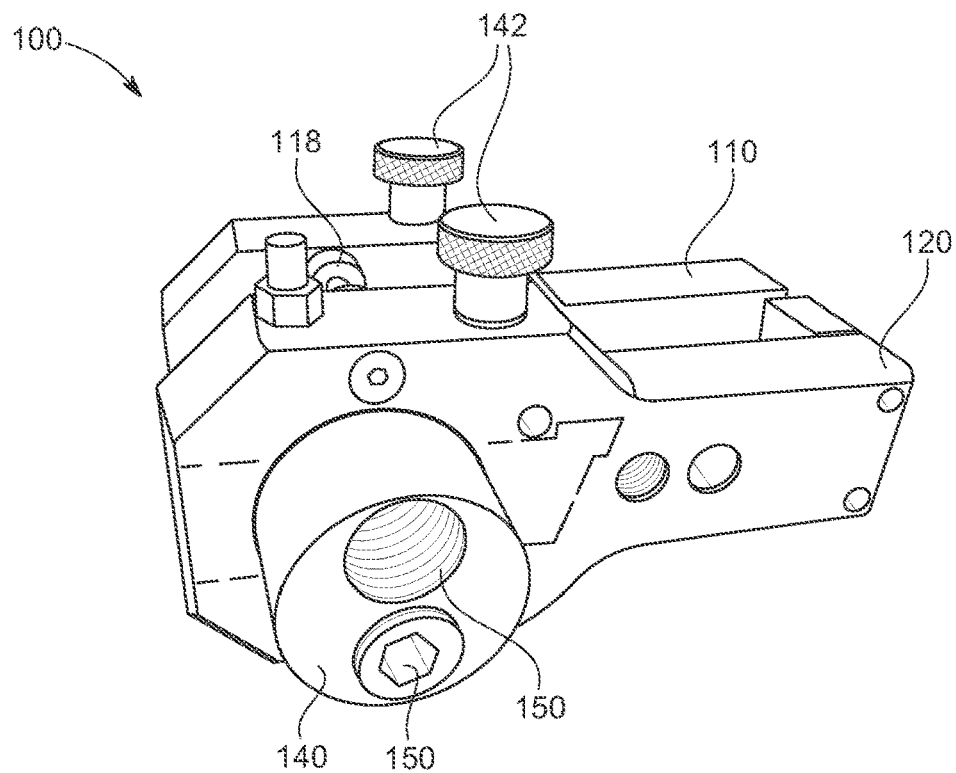

The rotatable cylinder 140 is a structure which is movable within each of the first and second bodies 110, 120, respectively, in order to correctly position the engagement devices 150 relative to the position of the rivet 18. Each of the rotatable cylinders 140 may extend beyond the rear face of the bodies 110, 120, respectively, to allow the user to grasp the outer portion of the cylinder 140 and rotate it relative to the bodies 110, 120. Labels or other identifiers may be positioned on the outer surfaces of the cylinders 140 to allow the user to gauge the position of the engagement devices 150 contained therein, such as shown in FIGS. 4 and 6. The cylinders 140 may be retained in a stationary position within the bodies 110, 120 by the use of a pin 142, which is insertable through one of the bodies 110, 120 and into the cylinder 140. These pins 142 should depress to the lock side (in or out) of the cylinder 140 and may be removed from the bodies 110, 120 when rotation of the cylinder 140 is desired, and then reinserted into the bodies 110, 120 when the desired position of the cylinder 140 is achieved.

Generally, there may be two positions for the cylinder 140: a rivet removal position and a rivet insertion position. These two positions correspond to an alignment of the engagement devices 150 with the rivet 18. For example, as shown in FIG. 7, the engagement devices 150 may include one structure for pushing the rivet out, which is referred to as a driver. This is shown as the top engagement device in FIG. 7. The other structure is for compressing a new rivet during installation of the rivet 18. This device is referred to as an anvil, and is shown in the lower position in FIG. 7. The driver may have a smaller diameter point which allows it to make contact with the rivet 18 and force it out of the rivet hole, whereas the anvil has a blunted cone shape which manipulates the exposed edge of the rivet 18 to increase or flare its diameter, thereby preventing it from being removed. Other shapes and other structures for the engagement device 150 may also be used.

In use, the user may move the engagement devices 150 with an appropriate tool, such as a ratchet driver or torque wrench which is connectable to one of the engagement devices 150 at a time and can cause the engagement device 150 to rotate within the cylinder 140. A threaded interface between the engagement device 150 and the cylinder 140 may allow for translational movement of the engagement device 150, thereby causing it to move into or retract from the space 102 between the bodies 110, 120. While one cylinder 140 on one body 110 may carry the driver and anvil engagement devices, the opposing cylinder 140 on the other body 120 (FIG. 8) may have receiving engagement devices 150. This may include another anvil (not shown in FIG. 8) which corresponds to the anvil in the first body 110, thereby allowing for compression of the rivet 18 from both sides during installation. For removal of the rivet 18, the second engagement device may include a clear hole (shown in FIG. 8) to allow the rivet 18 to fall out of the cylinder 140 when it has been pushed out by the driver.

To use the apparatus 100 to remove a rivet 18, the user may release the fastener 112 to allow for enlargement of the space 102 between the first and second bodies 110, 120. The user may then position the apparatus 100 on the tooth 12, such that the locator pins 130 are positioned within the aperture of the tooth 12 and against the edge of the tooth 12 (shown in FIG. 13). The user may then ensure that the cylinder 140 is positioned in the correct alignment of the engagement device 150 to the rivet. For removal of a rivet 18, the correct alignment would be when the drive is positioned over the rivet 18 on one side, and the opposing side of the rivet is aligned with the clear hole in the other cylinder 140. The user then clamps the first body 110 to the second body 120 with the fastener 112, which secures it in place. Then, the user uses a wrench or similar device to move the engagement device 150 (the driver) into the space 102, thereby contacting the rivet 18 with sufficient force to push it out of the tooth 12 and saw body 10. The apparatus 100 can then be removed from the tooth 18 and the tooth 18 can be removed from the saw body 10.

For installation of the rivet 18, the user places a new rivet 18 within the rivet hole between the new tooth 12 and the saw body 10. The user then places the apparatus 100 about the tooth 12 in the correct alignment with the locator pins 130. The desired position of the cylinder 140 is selected by rotating the cylinder 140 to align the anvils with the rivet 18. The first body 110 is then tightened to the second body 120 with the fastener 112. The user then uses a wrench or similar tool to tighten one or both of the anvils against the rivet 18, which acts to enlarge or flare the exposed head of the rivet 18, thereby retaining it in place between the tooth 12 and the saw body 10.

Other features of the invention of this disclosure may be apparent to one having skill in the art by viewing FIGS. 2-15 provided herein. All such features, functionality, or uses, while not explicitly described herein, are considered within the scope of the present disclosure.

Figure 16:
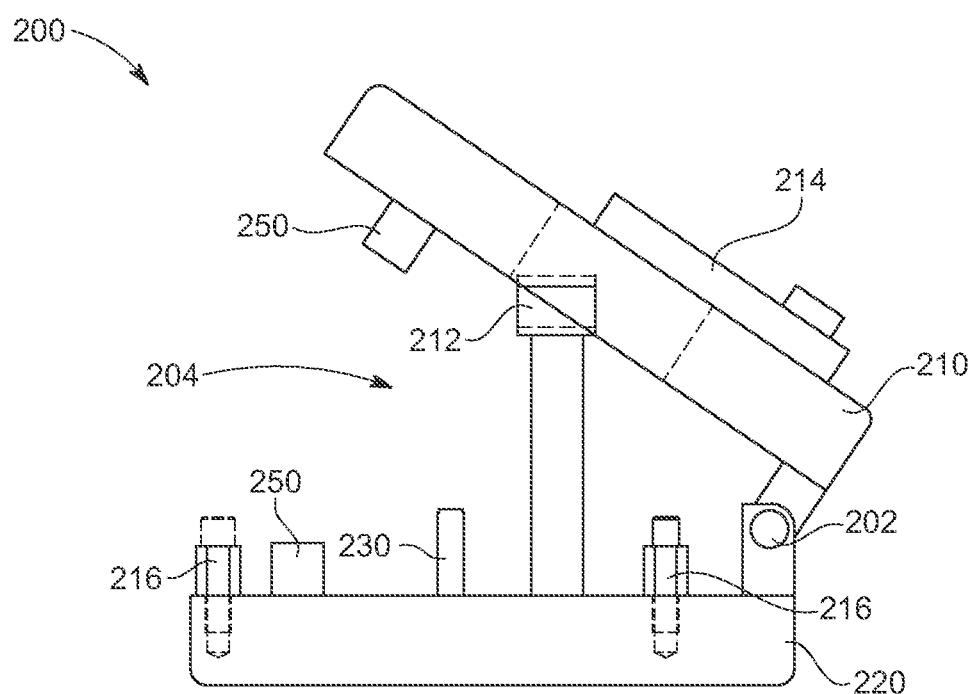
FIGS. 16-17D are drawings of an apparatus for removing and installing slasher teeth in a saw, in accordance with the first exemplary embodiment of the present disclosure.
Figure 17A:
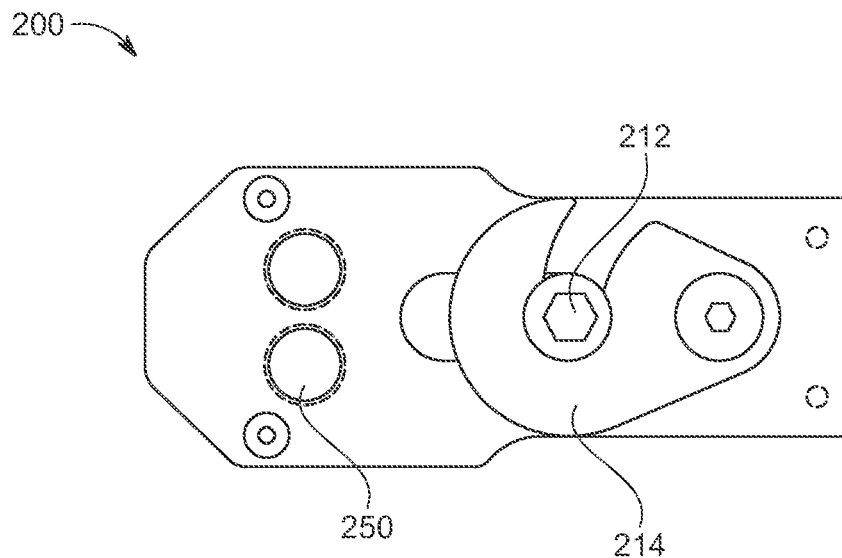
Figure 17B:
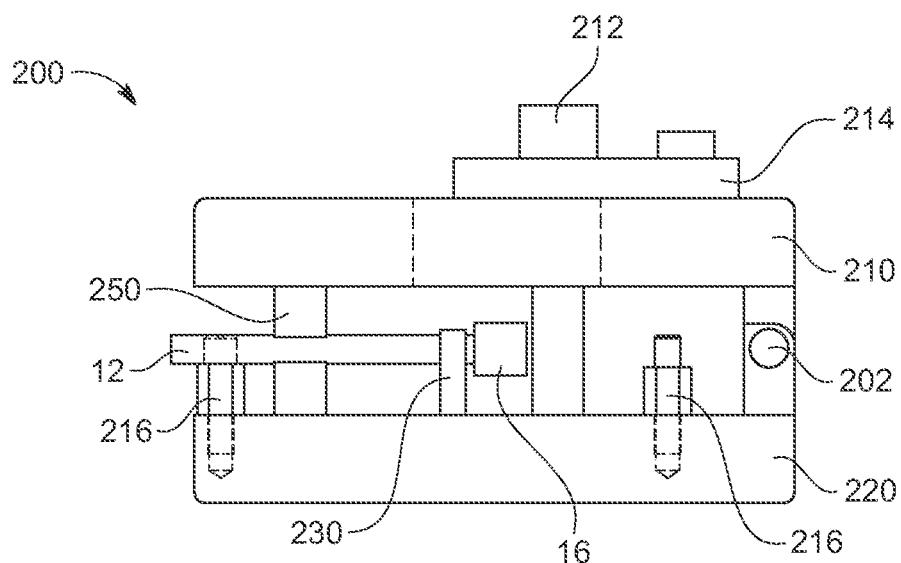
Figure 17C:
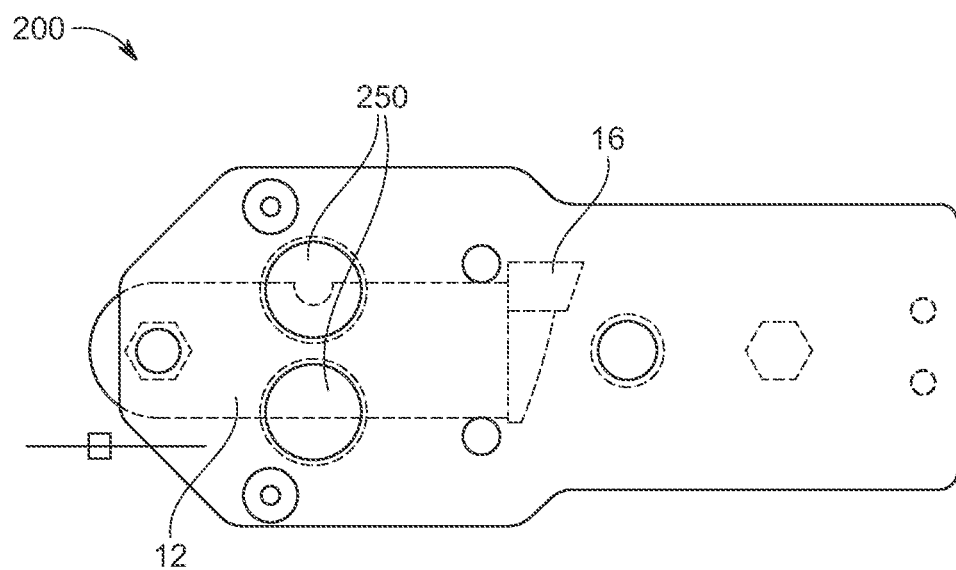
Figure 17D:
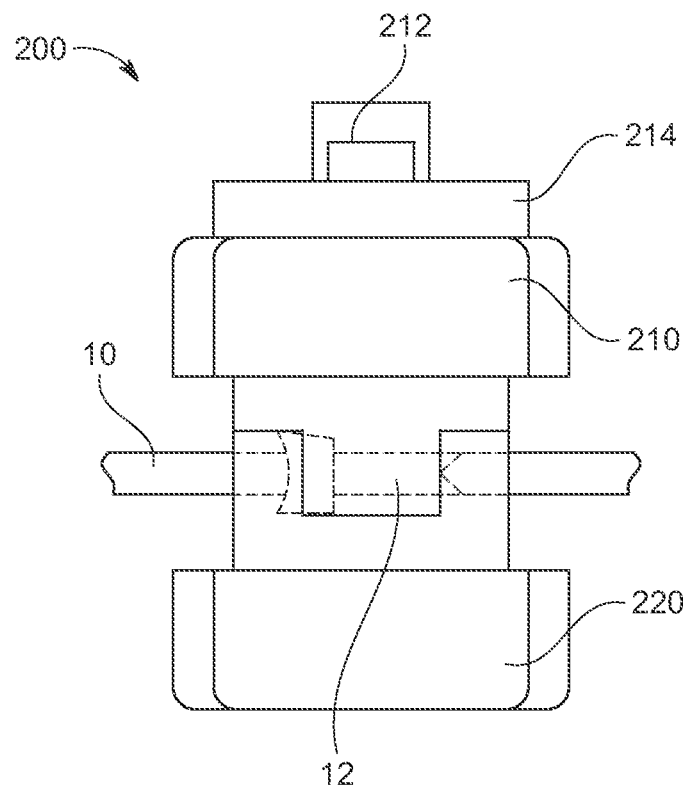

FIGS. 16-17D are drawings of an apparatus 200 for removing and installing slasher teeth in a saw, which is a variation in design from the apparatus 100, in accordance with the first exemplary embodiment of the present disclosure. In particular, FIGS. 16-17D illustrate another embodiment of the apparatus 100 discussed relative to FIGS. 2-15, where many of the same components and features of the apparatus 100 are included in the apparatus 200 of FIG. 16-17D. It is noted that the description of the relevant and/or common features of the apparatus 100 in FIGS. 2-15 applies to the apparatus 200 in FIGS. 16-17D, the description of which is not reproduced for clarity in disclosure.

Unlike the apparatus 100 of FIGS. 2-15, the apparatus 200 of FIGS. 16-17D includes a hinged design whereby a hinge 202 is connected between the first and second bodies 210, 220, such as to form a clam shell design. In this design, the apparatus 200 may be hingedly opened to create a gap 204 between the first and second bodies 210, 220. With the enlarged gap 204, as shown in FIG. 16, the apparatus 200 may be placed on a saw blade (FIGS. 17C-17D) relative to a tooth 12 (FIG. 17C) in the same manner as described relative to FIGS. 2-15. When the apparatus 200 is positioned about the slasher tooth 12 of the saw blade 10, as shown in FIGS. 17B-17D, the first and second bodies 210, 220 of the apparatus 200 may be closed and locked into place, such as with a fastener 212 or similar structure, which can be retained by a clasp 214 connected to the first body 210. For example, as shown in FIG. 17A, the clasp 214 may be pivotal such that it can be swiveled to the side when the fastener 212 head is moved through the first body 210 at which point the clasp 214 can be swiveled to catch the head of the fastener 212 in a groove or notch of the clasp 214.

Additionally, whereas the apparatus 100 includes a rotatable cylinder 140, the apparatus 200 does not have a rotatable cylinder because a user can switch between compression and extraction positions of the rivet simply by rotating the device about the saw blade 10. As such, the apparatus 200 can utilize one or more engagement devices 250 which can be used to compress or extract a rivet, similar to as described relative to FIGS. 2-15. When a user desires to extract a rivet, he or she can position the apparatus 200 over the saw blade 10 and in the correct position relative to the rivet 18B (FIG. 1A). The correct position may be achieved with one or more locator pins 230 which align with one or more holes within the slasher tooth 12. The user then engages the engagement device 250 to provide a compressive force on the rivet and drive it out of the hole within the slasher tooth 12 of the saw blade 10.

When the user desires to reinsert a new rivet, he or she can remove the fastener 212 and flip the apparatus 200 180°, such that an engagement device 250 can be aligned with the rivet to compress and deform it into a stationary position between the saw blade and the tooth. Thus, when the apparatus 200 is positioned on the saw blade, one path of the engagement device is in line with a knockout screw to remove a rivet, and when the apparatus 200 is flipped, another engagement device 250 is in line with the rivet for compression. The apparatus 200 may also include any of the other features discussed relative to FIGS. 2-15, such as one or more alignment devices 216, which can contact the underside of the slasher tooth 12 or the saw body 10 to prevent torsion or other forces when the force is applied against the rivet by the engagement device 250.

Figure 18:
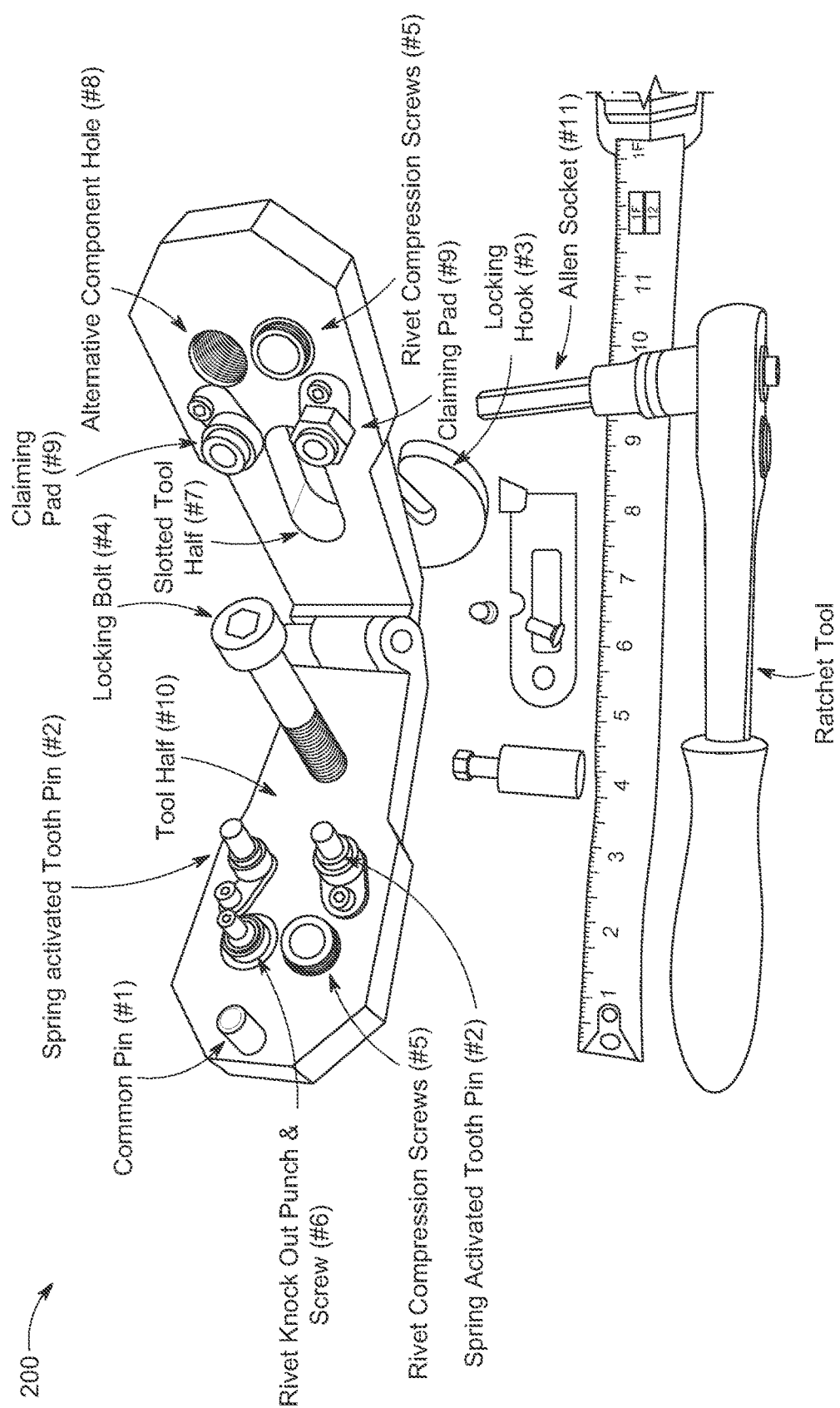
FIG. 18 is a labeled illustration of the apparatus for removing and installing slasher teeth in a saw of FIGS. 16-17D, in accordance with the first exemplary embodiment of the present disclosure.

The operation of the apparatus 200 is next described relative to FIG. 18. As shown, FIG. 18 is a labeled illustration of the apparatus for removing and installing slasher teeth in a saw of FIGS. 16-17D, in accordance with the first exemplary embodiment of the present disclosure. Operation of the apparatus 200 can be achieved using an Allen wrench with a drive ratchet, such as a ⅜ Allen connected to a ½" drive ratchet. No other devices are required to operate the apparatus 200.

Instructions for Rivet Removal:

Holding apparatus 200 in left hand-position, swivel hook side on the right. With the right hand, open the apparatus 200 such that the Common Pin (#1) should be located on left hand side. Insert Common Pin #1 into Common Hole of saw tooth shank to be removed. At the same time, position Spring Activated Tooth Pin #2 beneath carbide-and confirm Knock Out pin #6 is aligned with rivet. Holding the apparatus 200 now against side of blade, close clam shell and swing Locking Hook #3 into position to enable a clamp function. Confirm Compression Screws #5 are not in contact yet with Tooth saw shoulder when tightening Locking Bolt #4. Insert ⅜" Allen wrench socket attached to the ½" Drive Ratchet and tighten the Locking Bolt #4. Then insert ⅜" Allen wrench into rivet Compression screws #5, one at a time, and snug each against tooth. The saw shoulder should act as another clamp, which prevents twisting of the apparatus 200 when forces are applied to the knockout screw into rivet. Insert ⅜" Allen wrench into rivet Knockout Pin screw #6 and begin to screw in hex head screw forcing pin to push out the rivet. When that is completed, unscrew Knock Out screw #6 enough to position for next tooth removal with no contact at beginning again. Then unscrew Locking Bolt #4 enough to swing Locking Hook #3 and open the apparatus 200. Proceed to start position for next tooth to be removed. The rivet compression screws should be checked, backed off and snug in again, to clamp and to prevent twisting of the apparatus 200 on next tooth to be removed.

Instructions for Installing New Teeth:

Insert a new Kodiak style tooth in pocket with rivet hole halves matched to now have the needed ¼" circular hole without contact-breaking the carbide. Insert new rivet with the pre flared head (on the same side as the apparatus 200's shank Common Pin) into the rivet hole. Open the apparatus 200, place Common Pin #1 into Common hole of saw tooth shank to be removed. At same time, position Spring Tooth Pin #2 beneath the carbide tip, close the clam shell and swing Locking Hook #3 into position to enable a clamp function. Insert ⅜" Allen into Locking Bolt #4 and tighten. Confirm the apparatus 200 did not move and Spring Tooth Pin #2 is beneath and against the tooth shank. Then snug rivet Compression screw #5 on flared head of rivet with ⅜" Allen wrench. Then on other side (Barrel side), insert ⅜" Allen wrench into rivet Compression screw #5 and tighten to about 50 pounds of torque. This will cause the rivet to mushroom out to about ⅜". With rivet now flared out enough, unscrew compression screws to neutral position for next rivet to be flared. Insert ⅜" Allen into Locking Bolt #4 and unscrew ¼ turn to release Locking Hook #3 open the apparatus 200.

Figure 19:
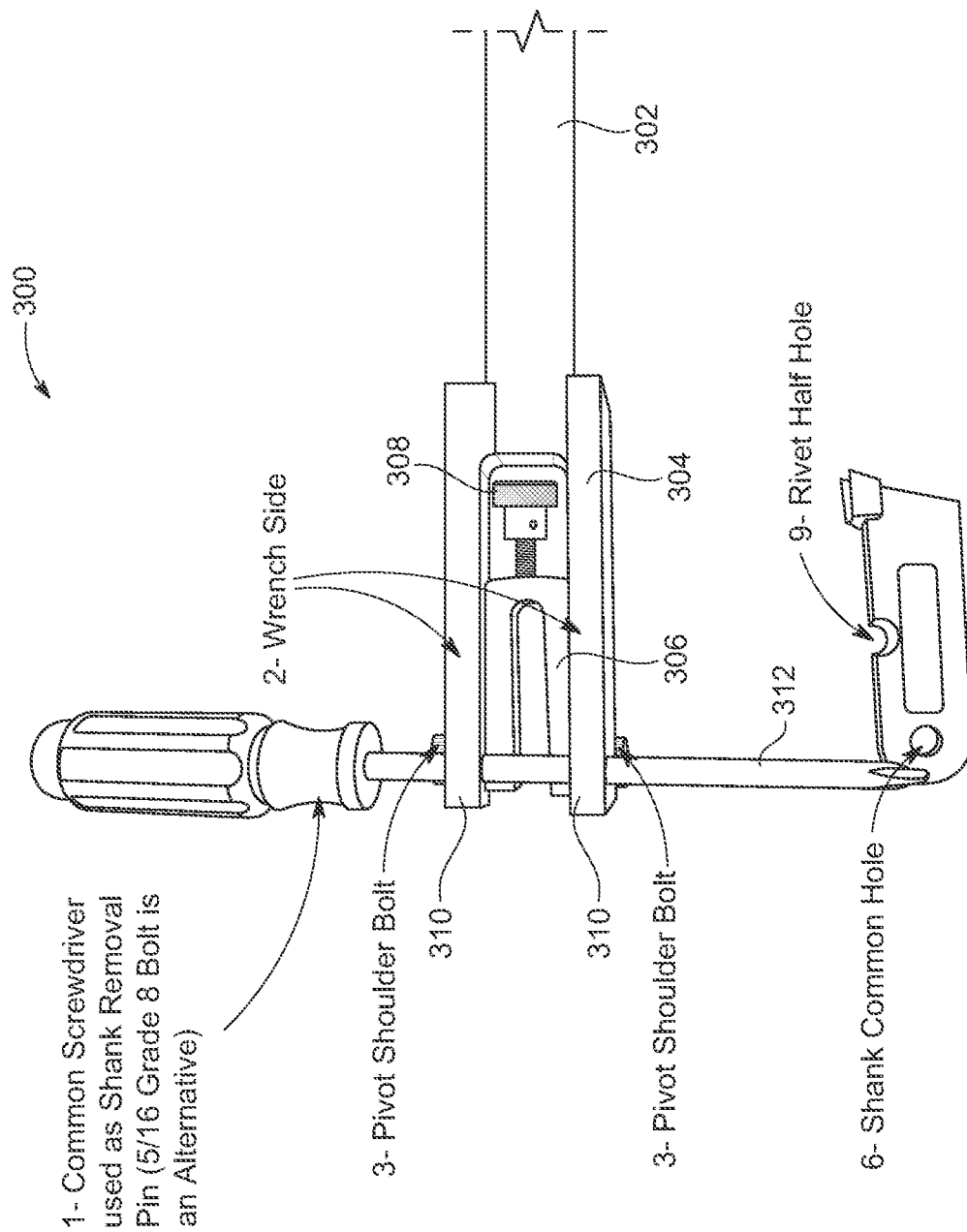
FIGS. 19-20C are illustrations of an apparatus for withdrawing a slasher tooth and shank from a pocket in a saw, in accordance with a second exemplary embodiment of the present disclosure.
Figure 20A:
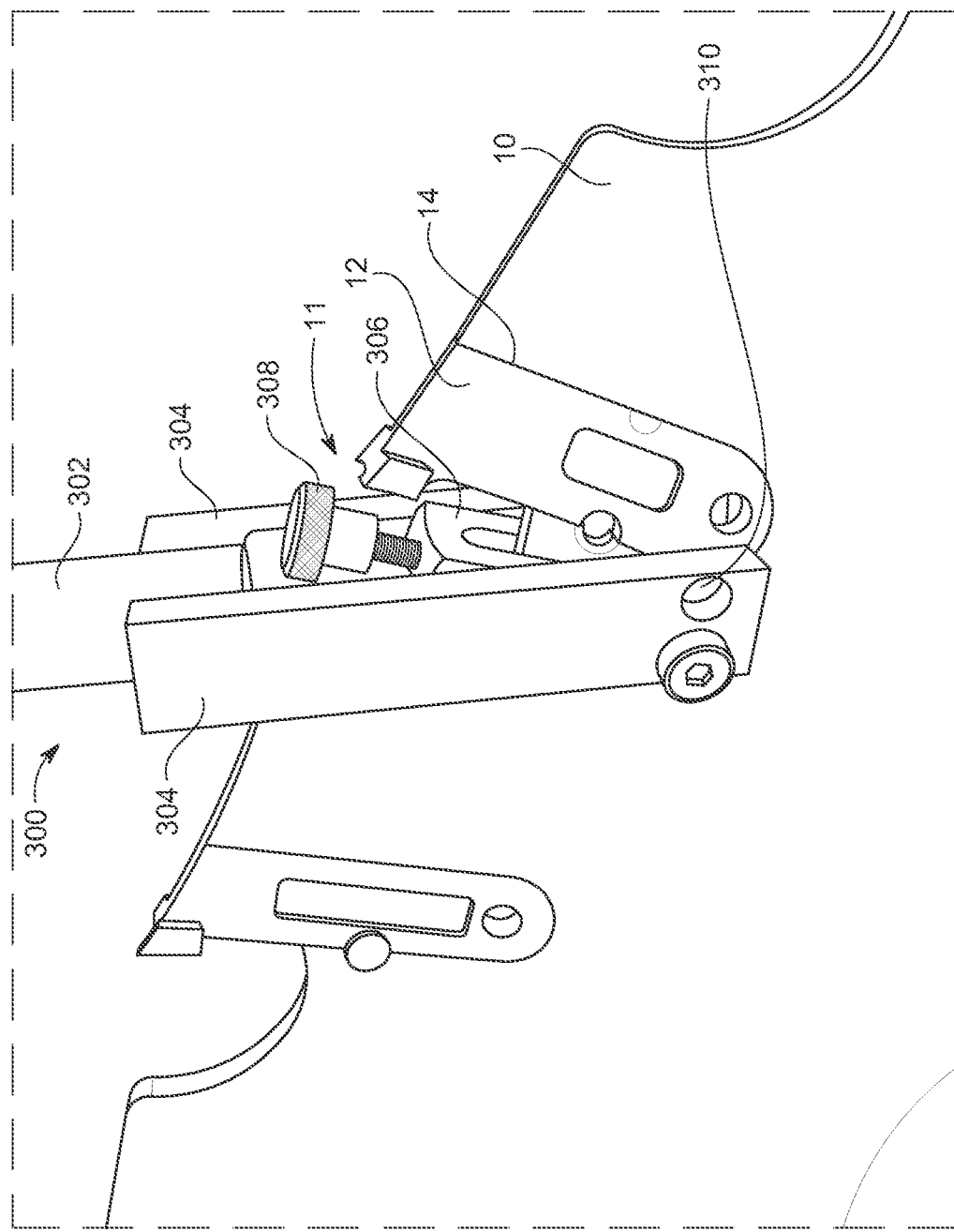
Figure 20B:
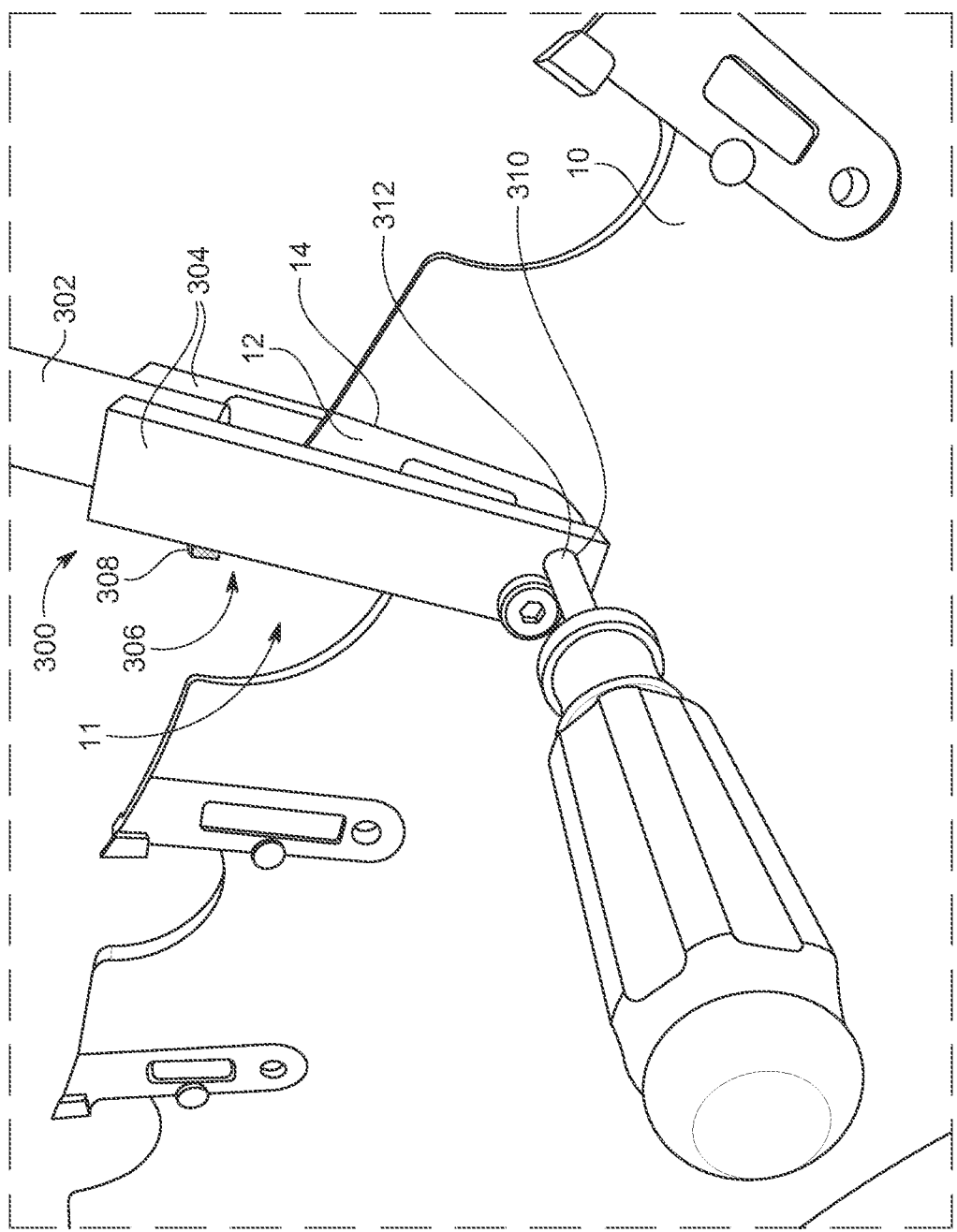
Figure 20C:
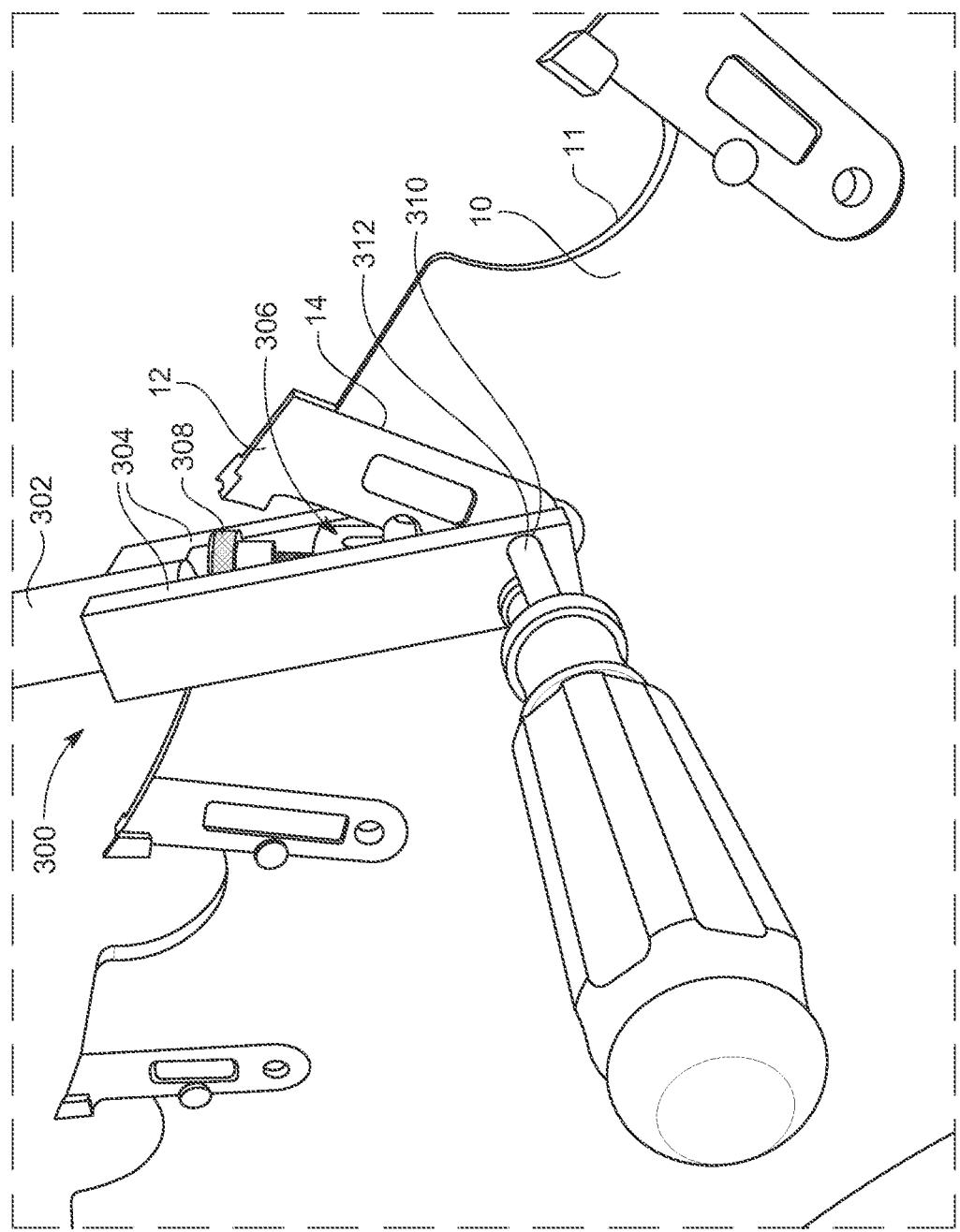

While FIGS. 2-17 describe the process of removing the rivet 18 from the tooth 12 and saw 10, FIGS. 19-20C are illustrations of an apparatus 300 for withdrawing a slasher tooth 12 from a pocket 14 of a saw 10, in accordance with a second exemplary embodiment of the present disclosure. With reference first to FIG. 19, the apparatus 300 for withdrawing the tooth includes a handle 302 which is attached to a forked portion 304. The forked portion 304 extends away from the handle 302 and has a gap between the two portions forming the forked portion 304. Within the middle of the forked portion 304, e.g., within the gap, is a floating shank positioner 306 which is pivotally connected to the forked portion 304 proximate to the terminating end thereof, such as with a pivot shoulder bolt. It also has a threaded adjustment device 308 connected to an opposing end of the floating shank positioner 306. The threaded adjustment device 308 may be implemented as a thumb screw which provides height adjustment of the floating shank positioner 306 relative to the cavity 11 of the saw body 10, which allows for the apparatus 300 to function on a variety of differently sized saw bodies 10 with differently sized cavities 11 or slasher teeth 12. The apparatus 300 further includes at least one common hole 310 formed through the forked portion 304 in a location near the terminating ends thereof. This common hole 310 allows for insertion of a removable pin 312 which is positionable through the aperture at the distal end of the tooth shank. As shown in FIG. 19, the pin 312 may be a common screwdriver which has a cylindrical shank that can fit through the aperture within the tooth. In one of many alternatives, the pin 312 may be a bolt or another cylindrical implement.

FIGS. 20A-20C illustrate the apparatus 300 in use. In FIG. 20A, the apparatus 300 is positioned over the saw body 10 and substantially over the cavity 11 within the saw body 10 which is positioned proximate to the saw body pocket 14 with the slasher tooth 12 positioned therein. As can be seen, in this position the floating shank positioner 306 is located such that the end of the threaded adjustment device 308 can contact the outer, radial edge of the saw body 10 within the cavity 11 thereof. This allows for proper height adjustment of the apparatus 300. Next, as shown in FIG. 20B, the handle 302 is moved to position the forked portion 304 substantially over the slasher tooth 12 until a pin 312 can be inserted through the common hole 310 within the apparatus 300 and within the hole from the removed rivet 18B (FIG. 1A) within the tooth 12. The pin 312 locks the apparatus 300 to the slasher tooth 12. As shown in FIG. 20C, as the user applies pressure to the handle 310 in a direction away from the slasher tooth 12, the end of the threaded adjustment device 308 contacts the cavity 11 of the saw body 10. This acts as a pivot point for the apparatus 300, which allows the force on the handle 302 to leverage pin 312 radially outwards along the saw body 10. This movement of the pin 312 transfers the force to the slasher tooth 12 which causes it to withdraw from the saw body pocket 14. From here, the slasher tooth 12 may be completely removed from the saw body pocket 14 and the pin 312 removed therefrom. The apparatus 300 can then be used, if desired, to install a new slasher tooth 12 within the saw body 10 with the reverse steps as described herein.

It should be noted that any process descriptions or blocks in flow charts should be understood as representing modules, segments, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. An apparatus for withdrawing a slasher tooth from a pocket of a saw, the apparatus comprising:
    a handle;
    a forked portion connected to one end of the handle, wherein a gap is formed between two prongs of the forked portion;
    a floating shank positioner positioned at least partially within the gap; and
    at least one common hole formed through the two prongs of the forked portion,
    wherein when the slasher tooth is connected to the at least one common hole, pivoting of the handle removes the slasher tooth from the pocket of the saw.

2. The apparatus of claim 1, wherein the floating shank positioner is pivotally connected to the forked portion.

3. The apparatus of claim 1, further comprising a threaded adjustment device connected to the floating shank positioner, wherein the threaded adjustment device provides a height adjustment of the floating shank positioner relative to a cavity of the saw.

4. The apparatus of claim 3, wherein the floating shank positioner further comprises a thumb screw.

5. The apparatus of claim 3, wherein an end of the threaded adjustment device contacts an outer, radial edge of the saw.

6. The apparatus of claim 1, wherein the at least one common hole is formed through the forked portion in a location near a terminating end of the forked portion.

7. The apparatus of claim 6, further comprising at least one pin which is insertable through the at least one common hole and an aperture in the slasher tooth, wherein the at least one pin removably connects the slasher tooth to the at least one common hole.

8. The apparatus of claim 6, wherein the at least one pin is removably positioned within an aperture at a distal end of the slasher tooth.

9. A system for withdrawing a slasher tooth from a pocket of a slasher saw, the system comprising:
    a slasher saw having a saw body with at least one slasher tooth positioned within at least one saw body pocket of the slasher saw;
    an apparatus for withdrawing the slasher tooth from the saw body pocket of the slasher saw, the apparatus having:
        a handle;
        a forked portion connected to one end of the handle, wherein a gap is formed between two prongs of the forked portion;
        a floating shank positioner positioned at least partially within the gap; and
        at least one common hole formed through the two prongs of the forked portion; and
    at least one pin connectable between the slasher tooth and the prongs of the forked portion through the at least one common hole, wherein when the slasher tooth is connected to the prongs, pivoting of the handle removes the slasher tooth from the saw body pocket.

10. The system of claim 9, wherein the floating shank positioner is pivotally connected to the forked portion.

11. The system of claim 9, further comprising a threaded adjustment device connected to the floating shank positioner, wherein the threaded adjustment device provides a height adjustment of the floating shank positioner relative to a cavity of the saw body.

12. The system of claim 11, wherein the floating shank positioner further comprises a thumb screw.

13. The system of claim 11, wherein an end of the threaded adjustment device contacts an outer, radial edge of the saw body.

14. The system of claim 9, wherein the at least one common hole is formed through the forked portion in a location near a terminating end of the forked portion.

15. The system of claim 14, further comprising at least one pin which is insertable through the at least one common hole and an aperture in the slasher tooth, wherein the at least one pin removably connects the slasher tooth to the at least one common hole.

16. A method of withdrawing a slasher tooth from a pocket of a slasher saw, the system comprising:
    providing a slasher saw having a saw body with at least one slasher tooth positioned within at least one saw body pocket of the slasher saw;
    providing an apparatus for withdrawing the slasher tooth from the saw body pocket of the slasher saw, the apparatus having:
        a handle;
        a forked portion connected to one end of the handle, wherein a gap is formed between two prongs of the forked portion;
        a floating shank positioner positioned at least partially within the gap; and
        at least one common hole formed through the two prongs of the forked portion;
    connecting at least one pin between the slasher tooth and the prongs of the forked portion; and
    pivoting of the handle relative to the slasher saw, thereby removing the slasher tooth from the saw body pocket.

17. The method of claim 16, further comprising pivotally connecting the floating shank positioner to the forked portion.

18. The method of claim 16, further comprising the step of adjusting a height of the floating shank positioner relative to a cavity of the saw body with a threaded adjustment device connected to the floating shank positioner.

19. The method of claim 18, further comprising contacting an end of the threaded adjustment device to an outer, radial edge of the saw body.

20. The method of claim 16, wherein connecting the at least one pin between the slasher tooth and the prongs of the forked portion comprises positioning the at least one pin in at least one common hole formed through the forked portion and an aperture in the slasher tooth.

* * * * *